United States Patent

[11] 3,587,433

| [72] | Inventor | Kintaro Yata |
| | | Ikeda, Japan |
| [21] | Appl. No. | 683,501 |
| [22] | Filed | Nov. 16, 1967 |
| [45] | Patented | June 28, 1971 |
| [73] | Assignee | Minolta Camera Co., Ltd. |
| | | Osaka, Japan |
| [32] | Priority | Nov. 18, 1966 |
| [33] | | Japan |
| [31] | | 41/7875 |

[54] CAMERA SHUTTER TIMING MECHANISM
6 Claims, 3 Drawing Figs.

[52] U.S. Cl. ........................................ 95/53, 95/10, 95/63, 95/64
[51] Int. Cl. ........................................ G03b 9/64
[50] Field of Search ........................................ 95/53, 64, 63, 10 (C) (Inquired)

[56] References Cited
UNITED STATES PATENTS

| 2,592,035 | 4/1952 | Jacoby | 95/10(C) |
| 2,999,445 | 9/1961 | Fahlenberg | 95/53(EO) |
| 3,063,354 | 11/1962 | Matulik | 95/10(C) |
| 3,095,795 | 7/1963 | Yates | 95/53(EO) |
| 3,165,989 | 1/1965 | Kiper | 95/10(C) |
| 3,286,610 | 11/1966 | Fahlengerg | 95/10(C) |
| 3,348,460 | 10/1967 | Schmitt | 95/64(X) |

*Primary Examiner*—John M. Horan
*Assistant Examiner*—Monroe H. Hayes
*Attorney*—Stanley Wolder ABSTRACT: An RC timing network controls the timing of a lens-type shutter and includes in series a timing capacitor, a first resistor which is varied to control the exposure time and a compensating second resistor which is coupled to the shutter aperture control to vary the second resistor resistance and hence the RC time constant directly with aperture size so that the effective exposure time is independent of aperture size.

PATENTED JUN 28 1971

3,587,433

INVENTOR
KINTARO YATA

BY Stanley Wolder

ATTORNEY

CAMERA SHUTTER TIMING MECHANISM

BACKGROUND OF THE INVENTION

The present invention relates generally to improvements in cameras and it relates more particularly to an improved camera shutter electronic timing system.

In the conventional camera shutter as typified by the diaphragm-type shutter, the graph showing the relationship between time and the amount of opening of the shutter, that is the interval of the opening the shutter, the interval of the shutter open position at a predetermined degree and the interval of the closing of the shutter is represented in the form of a trapezoid. Therefore, the effective time of exposure of the lens shutter is represented by an arithmetical mean between the upper and lower bases of the trapezoid each representing a time interval, so that there may sometimes occur a difference of more than 50 percent between the camera indicated time of exposure and the actual effective time of exposure. Thus, it is unavoidable that the actual time of exposure is quite different from an adequate or predetermined time of exposure determined or required by the indication of an exposure meter or the like. Mechanical arrangements are known and have been suggested for overcoming the above deficiency but these possess many drawbacks and disadvantages and leave much to be desired.

SUMMARY OF THE INVENTION

It is a principal object of the present invention to provide an improved camera.

Another object of the present invention is to provide an improved camera lens shutter timing system.

Still another object of the present invention is to provide an improved camera lens shutter timing system wherein the effective exposure time is substantially independent of the opening of the lens diaphragm.

A further object of the present invention is to provide an improved lens shutter timing system of the solid-state electronic type wherein the effective exposure time is electrically maintained substantially independent of the opening of the lens diaphragm.

Still a further object of the present invention is to provide a camera shutter timing system of the above nature characterized by its simplicity, accuracy, reliability and versatility.

The above and other objects of the present invention will become apparent from a reading of the following description taken in conjunction with the accompanying drawing which illustrates a preferred embodiment thereof.

In a sense, the present invention contemplates the provision of a camera including an adjustable lens diaphragm, a lens shutter, sequentially operable means for successively opening and closing said shutter, means for initiating the opening of said shutter and means for initiating the closing of said shutter, means for timing the interval between the activation of said shutter opening initiating means and said shutter closing initiating means comprising an RC network, and compensating means for varying the time constant of said RC network in response to the opening of said diaphragm whereby to maintain the effective exposure time of said shutter substantially independent of the opening of said diaphragm.

According to a preferred form of the present camera, the timing means includes a solid-state amplifier and the RC network includes in series connection, a first selectively adjustable variable resistor, a second variable resistor mechanically coupled to the lens diaphragm so that an increase in the lens opening effects an increase in the resistance of the second resistor, and a capacitor connected across the amplifier input A solenoid for initiating the closing of the shutter is connected through a normally open first switch in series with a voltage source across the amplifier output, and a second normally closed switch is connected across the capacitor and ganged with the first switch. By the simple expedient of providing a variable resistor controlled in response to the lens diaphragm opening and connected in the RC timing network, effective exposure deviations consequent to different lens diaphragm openings are fully compensated.

DESCRIPTION OF THE PREFERRED EMBODIMENT

Figure 1:
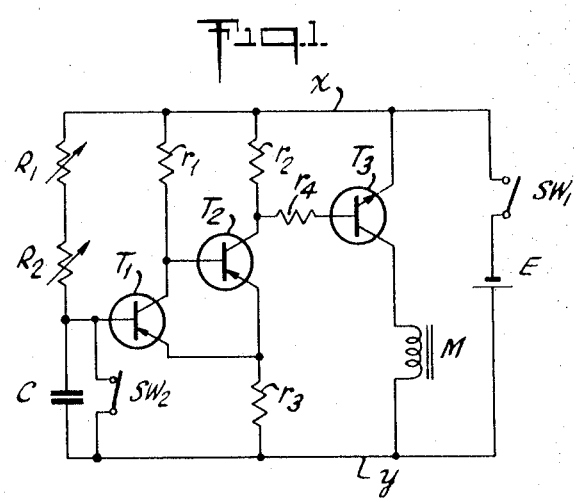
FIG. 1 is a circuit diaphragm of a compensated timing network section of a shutter embodying the present invention.

Referring now to the drawing which illustrates a preferred embodiment of the present invention, the reference letter E generally designates a battery which is connected in series with a normally open switch $SW_1$ between a pair of lines $x$ and $y$. An RC timing or time delay network is connected between the lines $x$ and $y$ and comprises in successive series connection a first variable resistor $R_1$, a second variable resistor $R_2$ and a capacitor $C$. A normally closed switch $SW_2$ is connected across the capacitor $C$ and is coupled to the switch $SW_1$ so as to open with the closing of switch $SW_1$ and close with the opening thereof. The switches $SW_1$ and $SW_2$ are suitably coupled to the camera shutter so that the switches $SW_1$ and $SW_2$ close and open respectively upon the initiation of the shutter opening and open and close respectively with the closing of the shutter.

The capacitor $C$ is connected between line $y$ and the base of a transistor $T_1$, the emitter of which is connected through a resistor $R_3$ to line $y$ and the collector of which is connected to the base of a transistor $T_2$, and through a resistor $R_1$ to line $x$. The emitter of transistor $T_2$ is connected to the emitter of transistor $T_1$ and the collector thereof is connected through a resistor $r_2$ to line $x$ and through a resistor $r_4$ to the base of a transistor $T_3$. The emitter of the transistor $T_3$ is connected to line $x$ and the collector thereof is connected through a shutter closing release solenoid or electromagnet M to line $y$. The transistor $T_3$ is of a different type than transistors $T_1$ and $T_2$.

Figure 2:
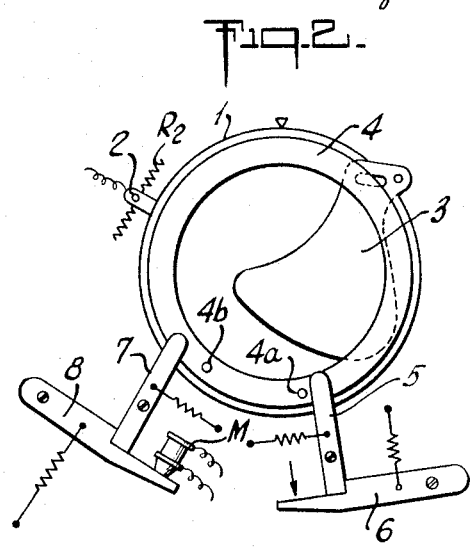
FIG. 2 is a schematic front view of the associated shutter mechanism.

FIG. 2 schematically illustrates a lens shutter in which the timing network described above with reference to FIG. 1 is incorporated. A diaphragm or aperture ring 1 is provided with a projecting brush 2 which is adapted to slideably engage and contact the resistance element of the second variable resistor $R_2$ for correcting the time of exposure and is interrelated with a sector ring 4 provided with pins 4a and 4b which in turn are correlated with a shutter blade 3, a plurality of which are preferably provided. One end of a first driving lever 5 which is adapted to impart the opening action to the shutter blade 3 by the engagement with the pin 4a is spring biased in the counterclockwise direction, while the other end of the lever 5 engages a first reclosable locking lever 6 which is spring biased in the clockwise direction. A second driving lever 7 which is adapted to impart to the shutter blade 3 the shutter closing motion in cooperation with the second pin 4b is spring biased in the clockwise direction. The tail end of the second driving lever 7 is adapted to bear against a second releasable locking lever 8 which is spring biased in the clockwise direction by means of relatively a weak spring, and which faces and may be releasably maintained in a locked position by the electromagnet M.

Figure 3:
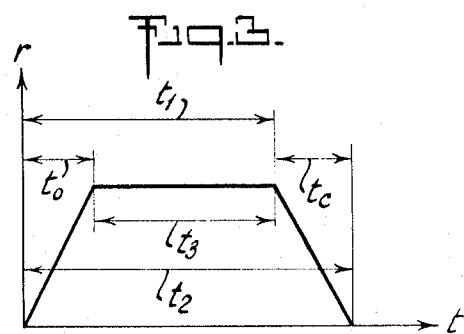
FIG. 3 is a graph illustrating the relationship between time and the shutter opening positions.

It is well known that in the lens-type shutter the opening of the shutter begins from the center of the shutter and then increases radially toward the periphery of the shutter so as to be fully opened, whereas the closing of the shutter begins from the portion near or in contact with the periphery of the shutter and advances toward the center of the shutter where the shutter is completely closed. Therefore, when the time is plotted as the abscissa and the radius $r$ of the opening of the shutter is plotted as the ordinate, the relationship between the time and the degree of opening of the shutter is graphically represented by, for example, FIG. 3. Since the time when the lens shutter is kept opened fully at a predetermined opening degree is shorter than the time when the center portion of the shutter is kept opened, FIG. 3 shows the graph in the form of a trapezoid. In the same FIG., the reference character $t_2$, that is the lower base or side of the trapezoid shown designates the time interval from when the shutter is initially opened until the shutter is completely closed, whereas $t_3$, that is the upper base or side designates the time interval when the shutter is kept opened at a predetermined or preset opening. Generally, the arithmetical mean between the time intervals $t_2$ and $t_3$ is referred as the effective time of exposure. The reference characters $t_0$ and $t_1$ and $t_c$ designate respectively the time required from the time when the shutter begins to open until the shutter is opened to a predetermined or preset opening, and the time required from the time when the shutter begins to open until the time when the shutter begins to close, and the time when the shutter begins to close until it is closed. The times $t_0$ and $t_c$ are both represented by the following formulas as a function of an aperture ratio $f$:

$$t_0 = g(f), \text{ and}$$

$$t_c = g'(f)$$

Since the effective time of exposure of the lens shutter is defined as an arithmetic mean between the total exposure time $t_2$ and the time $t_3$, that is a period when the shutter is kept opened at a predetermined or preset opening as described before, the effective time of exposure $t_e$ can be expressed by the following equation:

$$t_e = \tfrac{1}{2}(t_1 + t_c + t_1 - t_0)$$

$$\tfrac{1}{2}(t_1 + g'(f) + t_1 - g(f))$$

$$\tfrac{1}{2}(2t_1 + g'(f) - g(f))$$

In the conventional lens shutter in which the shutter time $t_1$ is not calibrated or corrected, when a certain shutter speed is selected, then the shutter time $t_1$ is maintained constant even though the aperture ratio is varied, so that the effective time of exposure $t_3$ varies in accordance with the aperture ratios.

The system of the present invention effects the calibration or correction of the shutter time $t_1$ in response with the lens diaphragm aperture ratio. For this purpose, according to the present invention, the first variable resistor $R_1$ for setting the time of exposure and the second variable resistor $R_2$ for correcting the time of exposure are connected in series in such a way that the following relationship may be established:

$$t_1 aC(R_1 + R_2,$$

where $a$ is a constant, $C$ is the capacitance of the capacitor, and further the second variable resistor $R_2$ for correcting the time of exposure may expressed by the following equation:

$$R_2 = \frac{g(f) - g'(f)}{2aC}$$

seen from the above equation, the second variable resistor R2 is made to correlate with the aperture ratio so that the time $t_1$ that is the period from the time when the shutter begins to open until the time when the shutter begins to close can be calibrated or corrected. When this second variable resistance for correcting the time of exposure is circuited and the equation:

$$R_2 = \frac{g(f) - g'(f)}{2aC}$$

is substituted into the equation:

$$t_r = \frac{2t_1 - t_0 + t_c}{2}$$

$$\tfrac{1}{2}(2aC(R_1 + R_2) - g(f) + g'(f))$$

then, the effective time of exposure $t_e$ becomes $$t_e aCR_1$$

Hence, it will be seen that the effective time of exposure becomes independent of the aperture ratio. The value of the resistor $R_2$ and its variability relative to the lens diaphragm depends on the character of the shutter and may be readily and easily determined by one skilled in the art in view of the above.

Considering now the operation of the improved lens shutter described above, the depression of the camera shutter release button (not shown) swings the lever 6 counterclockwise to release the spring biased lever 5 which engages the pin 4a and rotates the sector ring 4 clockwise to thereby open the blade 3. Simultaneously with the swinging of the lever 6 to its unlock position, the switches $SW_1$ and $SW_2$ are respectively closed and opened to energize the timing network and effect the charging of capacitor C through the adjusting resistor $R_1$ and the compensating resistor $R_2$, and energize the electromagnet M through the conducting transistor $T_3$. The energized electromagnet retains the lever 8 in a locked position. After an interval determined by the time constant of the RC network as effected by the resistor $R_1$ and $R_2$ the capacitor C is charged to a voltage to sufficiently deenergize the electromagnet M through the transistors $T_1$, $T_2$ and $T_3$ to release the lever 8 to its unlock position which in turn releases the lever 7. The spring biased lever 7 rotates in the clockwise direction so as to restore the sector ring 4 to its original or initial position through the second pin 4b. Thus, the shutter blade 3 is closed and the first driving lever 5 is also caused to return to its initial position by means of the first pin 4a so as to reengage with the first engaging lever 6. At the same time, the second driving lever 7 is returned to its initial position by means of a well-known means (not shown).

In the conventional lens shutter, the effective time of exposure at a relatively high shutter speed such as 1/500 sec. with the lens diaphragm being set to the maximum opening is different by as high as 50 percent from the effective exposure time when the lens diaphragm is set to the minimum opening. Under the circumstances, a highly complicated mechanism has been required in a camera in which a lens shutter mechanism is incorporated in order to reduce or substantially eliminate such a large difference in the effective time of exposure when a correct exposure is required. However, according to the present invention, an accurate and adequate time of exposure which corresponds precisely with the indicated or preset shutter speed can be attained by inserting in series with the variable resistor $R_1$ for setting the time of exposure, the second variable resistor $R_2$ for correcting or calibrating an exposure time error caused by the variation of the aperture ratio, in combination or responsive with the first variable resistor $R_1$. Thus, it will be clearly understood that the present invention provides a means which is simple in arrangement and construction, but is highly effective in preventing the occurrence of the exposure time errors.

When the above described circuitry is incorporated in a camera, the brush 2 of the second variable resistance for correcting the exposure time may be connected directly or indirectly to the aperture ring 1 or the like as shown in FIG. 2. Then, the brush 2 slides along the second variable resistor $R_2$ so as to automatically select a suitable resistance when the aperture ring 1 is set to a desired value. Thus, the combined resistance $R_1$ and the selected resistance of the second variable resistor $R_2$ makes the effective time of exposure correspond to that indicated or preset by the diaphragm scale. Moreover, the present system can be simply incorporated in a camera in a similar manner to that of the prior art, and permits the achievement of an accurate time of exposure which precisely corresponds to the indicated or preset exposure time, independently of the aperture ratios.

While there has been described and illustrated a preferred embodiment of the present invention, it is apparent that numerous alterations, omissions and additions may be made without departing from the spirit thereof.

I claim:

1. In a camera comprising exposure means including an adjustable aperture diaphragm and a lens shutter mechanism provided with shutter blades outwardly and inwardly movable to open and closed positions respectively relative to the longitudinal axis of the shutter, means for opening and closing said shutter, and shutter timing means including an RC timing network for controlling the interval between the opening and closing of said shutter, the improvement wherein said RC timing network includes a capacitor and a first resistor variable independently of the size of said diaphragm aperture for varying the time constant of said RC network and a second variable resistor responsive to said diaphragm and variable to increase and decrease the time constant of said RC timing network with an increase and decrease respectively in the size of said diaphragm aperture, and comprising shutter closing means responsive to said RC timing network for initiating the closing of said shutter whereby to produce effective exposure times independent of the size of said diaphragm aperture.

2. The camera of claim 1 wherein said capacitor and said first and second resistors are connected in series, the resistance of said second resistor increasing and decreasing with increases and decreases respectively in the size of said diaphragm aperture.

3. The camera of claim 1, wherein said shutter closing means includes a solenoid and means for energizing said solenoid in response to the electrical state of said RC network.

4. The camera of claim 1, wherein said shutter closing means includes a solenoid, a tripping lever responsive to the energization of said solenoid for initiating the closing of said shutter, and means responsive to the charge on said capacitor for controlling the energization of said solenoid.

5. The camera of claim 1, including a solid-state amplifier having an input connected to said capacitor and an output, said shutter closing means including a solenoid connected to the output of said amplifier and a tripping lever responsive to the energization of said solenoid for initiating the closing of said shutter.

6. The camera of claim 1, including a solid-state amplifier having an input and an output, said capacitor being connected to said input, a voltage source, a normally open first switch, said shutter closing means including a solenoid connected in series with said voltage source and said first switch across said amplifier output, a normally closed second switch ganged with said first switch and connected across said capacitor, said first and second switches being respectively closed and opened with the opening of said shutter.